Patented Oct. 13, 1953

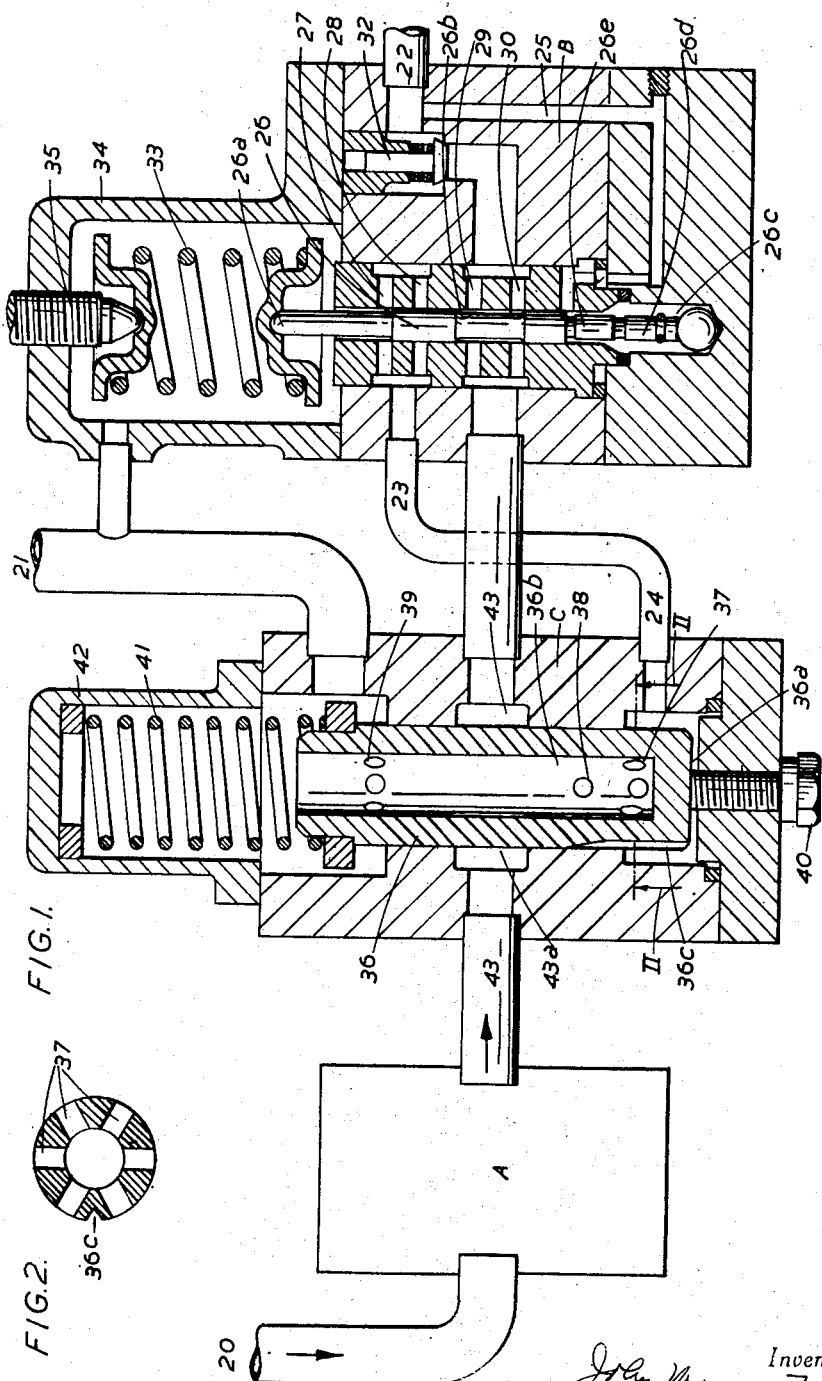

2,655,169

UNITED STATES PATENT OFFICE 2,655,169

AUTOMATIC UNLOADING VALVE FOR HYDRAULIC PUMPS

John Maurice Towler, Cumberland, and Frank Hathorn Towler, Otley, England, assignors to Electraulic Presses Limited, Rodley, England, a corporation of England Application July 8, 1947, Serial No. 759,628
In Great Britain April 24, 1947

11 Claims. (Cl. 137—108)

This invention relates to automatic unloading valves for continuously running hydraulic pumps of any known construction and particularly those having a substantially constant rate of delivery and of the kind which are used to supply pressure liquid to a hydraulic system which may comprise the cylinder or cylinders of a hydraulic press or other hydraulic machine, with or without a hydraulic accumulator for storing liquid under pressure.

Automatic unloading valves as at present constructed have a tendency to load and/or unload partially, particularly when the conditions are such that the pressure in the hydraulic system rises or falls very slowly. Also the operation of the unloading valve may cause considerable pressure surges or shock in the hydraulic system and, where the system is consuming a substantial volume of pressure fluid, almost equal to the maximum delivery of the pump, there is a tendency for the unloading valve to hunt violently. Thus it is a general object of this invention to provide an automatic unloading valve of improved construction which will operate smoothly and effectively without causing serious shock in the hydraulic system.

One object of this invention is to provide means whereby a pump of the type described above may be automatically unloaded so that the delivery of the pump is by-passed at a comparatively low pressure when the pressure in the hydraulic system reaches a predetermined figure and may be automatically loaded again so that the pump delivers into the hydraulic system when the pressure in the system falls below a predetermined figure. It is frequently desired to maintain pressure in a hydraulic system within fairly close limits of say 5% of a predetermined figure. When the hydraulic presses or machines are inoperative and there is very little leakage, the pump will be unloaded for considerable periods and momentarily loaded to make up leakage when the pressure falls below the limiting figure. On the other hand, if there is considerable leakage or there is an intermittent demand for hydraulic pressure to operate the hydraulic presses or machines, the pump will require to be loaded and unloaded very rapidly at frequent intervals in order to maintain the pressure in the system within the prescribed limits. Also it may be desired to increase or reduce the pressure in the hydraulic system, subject to the prescribed variation, by adjustment of the unloading valve. Therefore it is a further object of this invention to provide an unloading valve of simple and improved construction which is readily adjustable within a wide range of pressure and which is capable of operating automatically to maintain pressure in the hydraulic system within prescribed limits under widely varying conditions of fluctuation in the demand for hydraulic pressure. Yet a further object of this invention is to provide an unloading valve which will act as a relief valve when the upper pressure limit is reached prior to the unloading of the pump and in which adjustment may be provided whereby the pump is unloaded almost immediately the upper pressure limit is reached or alternatively whereby the unloading valve functions as a relief valve for a period prior to the unloading of the pump. Another object of this invention is to provide an unloading valve which can be so adjusted that it will not hunt violently between the loaded and unloaded positions and yet it will not take up a stable intermediate position in which the pump is partially unloaded.

In order that the invention may be clearly understood and carried into effect two embodiments will now be described by way of example, by aid of the accompanying drawings in which:

Fig. 1 is a sectional elevation, somewhat diagrammatic, of an unloading valve according to the present invention and embodying a master control valve having a single valve member and a by-pass valve.

Fig. 2 is a cross section on the line II—II of Fig. 1.

Figure 3:
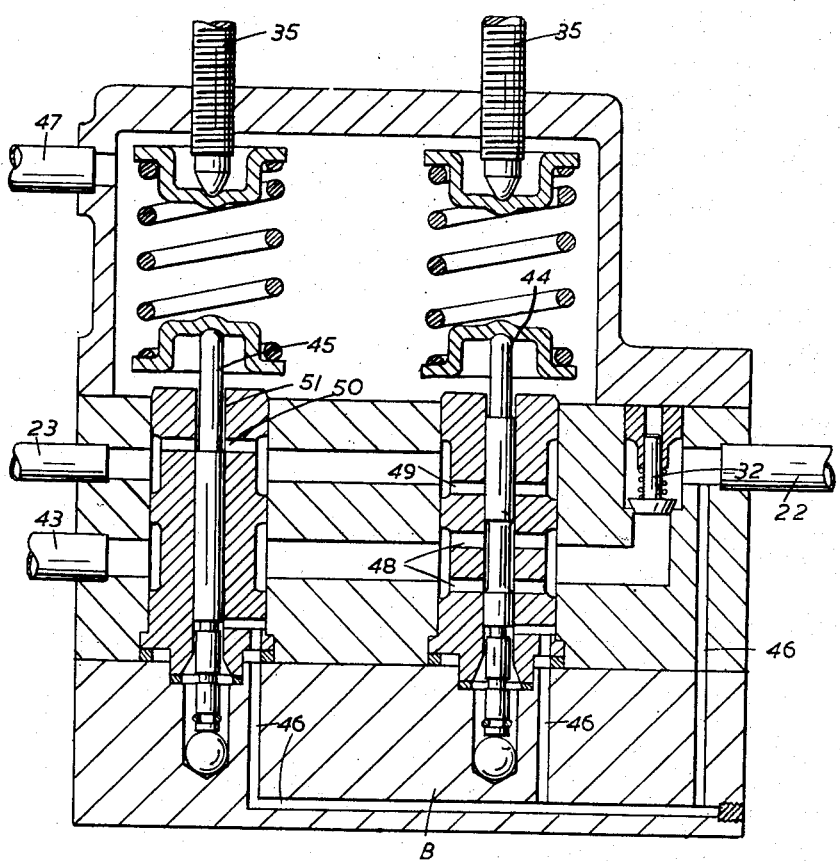
Fig. 3 illustrates, in sectional elevation, a modified form of master control valve which differs from the master control valve illustrated in Fig. 1 in that it comprises two valve members instead of one.

Referring now to Figs. 1 and 2 of the drawings, A represents the pump, B represents the master valve and C represents the by-pass valve. The inlet manifold 20 of the pump and the exhaust manifold 21 of the unloading valve are connected to a common supply tank. The delivery of the pump passes through the pipe 43 right through the two valves and through the non-return valve 32 to the hydraulic system by the pipe 22. The pressure connection 23 of the master valve B is in permanent communication with the inlet connection 24 of the by-pass valve C and therefore with a space enclosing the operative area 36a of the by-pass valve plunger or piston 36. The master valve plunger or piston 26 is loaded by a spring 33 enclosed in a spring housing 34 and an adjusting screw 35 is provided to regulate the force of the spring. The master valve piston has reduced portions 26a and 26b separated by a portion of full diameter. In the position shown on the drawing the master valve piston is in the "down position" and therefore the operative area 36a of the by-pass valve piston is connected to exhaust through the ports 27 and the reduced portions 26a and through the spring box 34 to the exhaust manifold 21. In the "up position" of the master valve piston the ports 27 are closed and the delivery of the pump is connected to the operative area of the by-pass valve piston 36a through ports 29, 28 and the reduced portion 26b. The hydraulic system 22 is in permanent communication with a space enclosing the operative area 26c of the master valve piston by means of the passage 25 and further reduced portions 26d and 26e of the master valve piston 26 and therefore the spring loaded master valve piston is at all times responsive to the pressure in the hydraulic system. The by-pass valve piston 36 is loaded by a spring 41 enclosed in a spring housing 42 and the piston has a central bore 36b which is at all times in communication with exhaust through the spring housing 42 and the exhaust manifold 21, a free passage from the central bore 36b to the spring housing 42 being provided by the "exhaust ports" 39. The low pressure by-pass ports consist of one or more radial holes 38 in the by-pass valve piston and the high pressure by-pass ports consist of a number of radial holes 37 in the by-pass valve piston. The leakage port or ports consist of one or more axial grooves on the bottom of the by-pass valve piston as shown at 36c. In the position shown on the drawing the by-pass valve piston is in the "loaded position" and this terminal position is adjustable by means of the screw 40. The high pressure by-pass ports 37 consist of a row of holes arranged in a helix so that as the by-pass valve piston moves upwards some of the holes are covered before the last port is finally closed. When the master valve piston moves into the "up position" the delivery of the pump is directed into the space at the operative end of the by-pass valve through connection 24 and thence it passes through the high pressure by-pass ports 37 and up through the central bore of the piston and out to exhaust through the manifold 21. If the volume delivered by the pump is sufficient to cause an adequate back pressure in passing through the high pressure by-pass ports such as to cause the by-pass valve piston to move upwards then the high pressure by-pass ports will be gradually closed and the by-pass valve piston will move into the "unloaded position" in which the low pressure by-pass ports 38 will be uncovered permitting communication between the chamber 34a in communication with the delivery pipe of the pump and the central bore of the by-pass valve piston 36b which is in communication with the exhaust manifold 21. In the "unloaded position" of the by-pass valve piston the leakage ports 36c provide communication between the chamber 43a and the space at the operative area 36a of the piston so that there is communication between the delivery of the pump and the operative area of the by-pass valve piston. Then when the master valve piston begins to move towards the down position connecting the space at the operative area of the by-pass valve piston to exhaust the spring 41 moves the by-pass valve piston into the "loaded position." It will be seen that the leakage port is in the form of a groove 36c of gradually diminishing depth at its inner end and it is so located in association with the low pressure by-pass ports 38 as to ensure that the leakage port is closed before the low pressure by-pass ports are closed and/or that as the piston 36 moves towards the "loaded position" the effective area of the "leakage port" 36c is reduced at greater rate than that of the low pressure by-pass ports 38 as and for the purposes previously described in the specification.

According to the embodiment of the invention as described up to this point, presuming the pump to be unloaded and to be maintaining some predetermined pressure, it would be possible to increase that pressure by screwing down the adjusting screw 35, increasing the load on the spring 33, causing the valve piston 26 to move downwards against the pressure on its operating area 26c and consequently to open the port 27 to exhaust and load up the pump by means of the by-pass valve C, causing the pressure in the system to rise to the desired higher figure when the pump would be unloaded by the master valve as hereinbefore described. On the other hand it would not be possible with the valve as described up to this point, to lower the pressure in the system by releasing the screw 35 decreasing the load of the spring 33 and permitting the valve piston 26 to rise because the pressure in the system and in passage 22 is prevented from returning by the check valve 32, and therefore cannot escape through port 28. In order to overcome this difficulty, and in accordance with a still further embodiment, the valve piston 26 is permitted to travel upwards beyond the point at which the port 28 is fully opened until the reduced portion 26e is in communication with port 30 so that, when screw 35 is released sufficiently, pressure in the system is enabled to force valve piston 26 sufficiently far upwards to put passage 25 into communication with port 30 so that pressure fluid in the system can escape via passages 22 and 25, reduced portion 26e, port 30, port 29, reduced portion 26b, port 28, passages 23 and 24, leakage port 36c, low pressure by-pass ports 38, passage 36b into exhaust manifold 21.

The above described unloading valve functions in the following manner. When the pressure in the hydraulic system reaches the upper pressure limit, it moves the master valve piston 26 to the "up position" and pressure liquid from the hydraulic system is thereby directed through the master valve to the operative area 36a of the by-pass valve piston 36, the pump A delivering pressure liquid to the hydraulic system preferably at a substantially constant rate. If, when the upper pressure limit is reached, a large proportion of the delivery of the pump is being used in the hydraulic system to operate hydraulic cylinders or other machines, then the surplus delivery through the high pressure by-pass ports 37 will not cause sufficient back pressure, acting on the operative area of the by-pass valve piston, to move it from the "loaded position" and therefore the unloading valve will operate as a high pressure relief valve. On the other hand, if only a small proportion of the delivery of the pump is being used in the hydraulic system, then the surplus delivery of the pump wil be comparatively large and its passage through the high pressure by-pass ports will be sufficient, acting on the operative area of the by-pass piston, to move it into the "unloaded position" thereby causing the delivery of the pump to pass through the low pressure by-pass ports 38 to exhaust or inother words the pump will be unloaded. When the pump is unloaded the pressure in the hydraulic system may fall due to leakage or a small demand for pressure liquid so that the piston 26 of the master valve moves into the neutral position and the pressure liquid is thereby locked in the space at the operative end of the by-pass valve and the by-pass valve will be locked in the "unloaded position" provided that there is no leakage between it and the master valve; but, in order to make up any such small leakage, low pressure liquid from the unloaded pump passes through the leakage ports 36c to the operative end of the by-pass valve piston and thereby ensures that it is held in the "unloaded position." Then, if the pressure in the hydraulic system falls still further, such that the master valve is moved to the "down position," the operative area of the by-pass valve piston will be thereby connected to exhaust and the delivery of the pump through the "leakage ports" will not be sufficient to maintain the pressure in the operative end of the by-pass valve to hold it in the "unloaded position" and consequently it will be moved by the spring 41 to the "loaded position" thereby simultaneously closing the low pressure by-pass ports 38 and the leakage ports 36c and the pump will be loaded.

It will be appreciated that the movement of the by-pass valve piston from the "loaded position" is dependent on the rate of flow from the master valve to the by-pass valve and the area of the high pressure by-pass ports; the latter area can be regulated as described above so that greater or less surplus delivery from the pump is needed to initiate the movement of the by-pass valve to the unloaded position. Thus the proportion of the delivery of the pump which may be discharged through the unloading valve, acting as a high pressure relief valve, prior to the unloading of the pump may be definitely regulated. Consequently it is a feature of this invention that the point at which the pump is unloaded is determined not merely by a rise in pressure in the hydraulic system but also by the rate at which pressure liquid is discharged through the unloading valve acting as a high pressure relief valve; or in other words the pump is unloaded when the rate of discharge at the upper pressure limit reaches a predetermined figure; the rate of discharge being determined by the difference between the rate at which pressure liquid is being used in the hydraulic system and the rate at which it is being supplied by the pump.

According to a further embodiment of this invention and as shown in Fig. 3 the master valve may be replaced by two spring loaded piston valves 44 and 45 which are responsive to the pressure in the hydraulic system through inlets 46 in permanent communication with the hydraulic system, and both valves having a common pressure connection 23 communicating with the by-pass valve and the valve 45 having an exhaust connection 47. The spring on the valve 44 is of such strength that when the pressure in the hydraulic system reaches the upper limit the piston of the valve uncovers ports 48, 49 providing communication between the pump delivery inlet 43 and the connection 23 to the by-pass valve. The spring on the other valve 45 is of such a strength that when the pressure in the hydraulic system falls to the lower limit the valve piston uncovers ports 50 providing communication through clearance 51 between the by-pass valve and exhaust 47. This enables the upper and lower limits of pressure to be regulated independently and they are not therefore dependent upon the rate of the spring or the distance between the ports. In other respects the unloading valve will function as described in the previous embodiment in conjunction with the by-pass valve described therein.

In any of the above described embodiments of the invention, when the by-pass valve is in the "unloaded position" and when the master valve is moving very slowly towards the "down position" the sequence of events is as follows: a very small quantity of oil escapes from the operative area of the by-pass valve through the master valve to exhaust. This temporarily lowers the pressure on the operative area of the by-pass valve so that the by-pass valve spring begins to move the by-pass valve towards the "loaded position." This movement reduces the area of the low pressure by-pass ports and raises the pressure in the pump delivery pipe which in turn causes sufficient oil to pass through the leakage ports to the operative area of the by-pass valve so as to equal that which is escaping through the master valve with the result that the original pressure on the operative area of the by-pass valve is restored and the by-pass valve piston is again in equilibrium. As the master valve moves further into the "down position" and exhausts more oil from the operative area of the by-pass valve there is a natural tendency for this sequence to repeat itself until full pressure is reached in the pump delivery pipe, in which case the pump would be partially loaded and the unloading valve as a whole would operate as a high pressure relief valve, causing wastage of power and heating of the oil. It is a feature of this invention that the low pressure by-pass ports and the leakage ports are so proportioned in relation to each other that, after a certain initial movement of the by-pass valve piston towards the "loaded position," and in spite of the continued rise of pressure in the pump delivery resulting from further movement, the flow through the leakage ports does not increase but tends in fact to decrease. This may be carried into effect in one of two ways or by a combination of both as follows:

a. By causing the leakage ports to close before the low pressure by-pass ports close.

b. By so shaping the two sets of ports in relation to each other that, as the by-pass valve piston moves towards the "loaded position" the area of the leakage ports decreases more rapidly than that of the low pressure by-pass ports so that, in spite of the rise in pressure in the pump delivery pipe, less oil passes through the leakage ports. The latter may be conveniently carried out by making the low pressure by-pass ports of rectangular or circular bore and the leakage ports of triangular bore and of gradually diminishing depth at their inner ends, but the invention is not limited to this combination of differently shaped bores.

An unloading valve according to this invention is designed more particularly for use with a hydraulic system in which oil or some fluid having lubricating qualities is the hydraulic medium and it is possible therefore to use valves of the packingless piston type, but it is not intended to limit the invention specifically to an oil hydraulic system.

We claim:

1. An automatically operated unloading valve for a pump comprising, in combination, means defining a flow passage having a pressure inlet for connection to the pump and a pressure outlet adapted for communication to a hydraulic system, a hydraulically operated by-pass valve defining a first passage for by-passing to exhaust some of the pressure liquid flow at the full pressure in the flow passage in the loaded position, and a second passage for by-passing to exhaust all of the liquid flow at a pressure lower than that existing in the flow passage in the unloaded position, said by-pass valve also having pressure responsive means for substantially sequentially closing said first passage and opening said second passage on increasing rise in liquid pressure applied thereto, and a master control valve having valve means responsive to pressure in the flow passage for diverting pressure liquid from the flow passage on a rise in pressure beyond a predetermined figure, and also having passage means for delivering the diverted pressure liquid to said first by-pass passage and applying the same to said by-pass pressure responsive means, said by-pass pressure responsive means being arranged to close said first by-pass passage and trap the pressure liquid applied to said by-pass pressure responsive means on a further rise in pressure attaining when the rate of by-pass through said first passage is insufficient to prevent the delivery of liquid to the outlet in excess of requirements, and said master valve pressure responsive means having ports associated therewith for communicating said trapped pressure liquid to exhaust upon a fall in the flow passage to permit said by-pass pressure responsive means to load the flow passage.

2. An automatically operating unloading valve for a pump, used for supplying pressure liquid through a flow passage to a hydraulic system through a non-return valve which is situated so as to prevent pressure liquid in the hydraulic system from flowing back to the pump delivery, said valve comprising, in combination, a hydraulically operated by-pass valve having a valve member in the form of a piston or plunger which is held in the flow passage loaded position by a spring and is movable against said spring by the admission of hydraulic pressure liquid into a space at one end of said piston into the flow passage unloading position, said spring returning the valve piston to the flow passage loaded position on the release of the hydraulic pressure from said space, and a master control valve having a valve member in the form of a piston or plunger one end of which is open to a space which in turn is in open communication with the pressure liquid in the flow passage at the down-stream side of the non-return valve, said plunger controlling an inlet and an outlet for pressure liquid, said outlet being connected with the space at one end of the piston of the by-pass valve and opened by the passage of pressure liquid from the inlet by movement of the control valve plunger against opposing spring pressure when the pressure at the outlet of the non-return valve rises beyond a predetermined figure, the pressure liquid in the space at the end of the piston of the by-pass valve being released to permit said piston to be returned to the flow passage loaded position when the pressure at the outlet of the non-return valve falls, the arrangement being such that the by-pass valve, without movement, by-passes some of the pressure liquid supply at the full pressure in the flow passage and, upon displacement of the by-pass valve piston in the event of the amount of liquid thus by-passed being insufficient to stabilise the pressure at the outlet of the non-return valve at the predetermined figure, to by-pass the whole of the pressure liquid supply at a pressure less than the pressure at the outlet of the non-return valve thereby fully to unload the flow passage.

3. An automatically operating unloading valve according to claim 1 wherein the by-pass pressure responsive means comprises a valve member serving to effect loading and unloading of the flow passage and having an operative area and a leakage passage to maintain said valve member in the unloaded position by permitting pressure liquid to have access to the operating area of the valve member when the main supply of pressure liquid to said area is cut off, and the space surrounding the same is closed to exhaust, said passage having an area sufficient to supply make-up liquid to compensate for leakage from such space but insufficient fully to meet the demand for pressure liquid when the space is open to a substantial extent to exhaust.

4. An automatically operating unloading valve according to claim 1 wherein the pressure responsive means comprises a valve member having a pressure operative area and two sets of by-pass ports, said valve member of the by-pass valve, in its movements between the flow passage loaded-unloaded-loaded positions, being arranged to control the opening and closing of said two sets of by-pass ports, one set being in said first passage for high pressure by-passing with the valve member in the flow passage loaded position, and the other set being in said second passage for a lower pressure by-passing with the valve member in the flow passage unloaded position, and the ports for the high pressure by-passing closed, and a leakage passage open to pass make-up liquid to the space enclosing the operative area of the valve member when the valve member is in the flow passage unloaded position and the supply of main pressure liquid to and its escape from said space is shut off by the pressure responsive means of the master control valve.

5. An automatically operating unloading valve according to claim 1 wherein the by-pass pressure responsive means, serving to effect loading and unloading of the flow passage, comprises a valve piston and a valve bore, said piston having a leakage passage in the form of a groove cut in the surface of said piston constituting the valve member of the by-pass valve and extending longitudinally from the operative area end of the valve member for a predetermined distance so as to bridge the normally closed section of the valve bore between the space enclosing the operative area of the valve member and a further space open to the flow passage when the valve member is in the flow passage unloaded position.

6. An automatically operating unloading valve according to claim 1 wherein the pressure responsive means of the master control valve includes a plunger having both a reduced portion and a full diameter section in its length, and a surrounding valve bore, said plunger portions being so disposed in relation to two longitudinally spaced sets of radial ports opening into the surrounding bore that when the control valve plunger is in one extreme position pressure liquid is permitted to pass freely from the inlet to the outlet through a non-return valve, and a space surrounding the operative area of the by-pass valve member is open to exhaust, and when the control valve plunger is in the other extreme position pressure liquid from the up-stream side of the non-return valve is permitted to pass into the space surrounding the operative area of the by-pass valve, and the outlet from said space to exhaust through the control valve is closed.

7. An unloading valve according to claim 1 wherein the master control valve pressure responsive means comprises two spring loaded valve members both of which are responsive to the pressure in the flow passage one valve member controlling the admission of pressure liquid to the by-pass valve and the other valve member its exhaust therefrom, the spring load on each valve member being independently variable whereby the upper and lower limits of pressure in the hydraulic system are capable of being regulated independently without this regulation being dependent upon the rate of a spring or the distance between ports.

8. An unloading valve according to claim 1 wherein the master control valve is operable to connect the flow passage to exhaust for the purpose of producing a fall in pressure, by permitting the valve member of the master control valve to have an extended travel beyond a normal maximum and for such travel to take place automatically by suitably reducing the opposing spring pressure.

9. An automatically operable unloading valve for a hydraulic pump comprising, in combination, means defining a flow passage having a pressure inlet adapted for connection to the pump and a pressure outlet adapted for connection to a hydraulic operating system, an exhaust passage, a master control valve and a by-pass valve connected in said flow passage, a control passage connecting said valves, a non-return valve at the downstream side of said control valve, said control valve being operable in response to a rise to a predetermined pressure at the outlet side of said non-return valve to by-pass liquid from said flow passage to said control passage, said by-pass valve having a bore, a chamber open to said bore and connected to said control passage, a valve member reciprocable in said bore and with an end pressure area exposed in said chamber, and spring means acting on said member in opposition to pressure in said chamber, said valve member having low pressure port means movable in response to a predetermined pressure rise in said chamber into position to unload said flow passage to said exhaust passage and having leakage port means for connecting said flow passage to said chamber, partial closing of said low pressure port means causing pressure elevation to effect replenishment through said leakage port means of the pressure in said chamber.

10. An unloading valve assembly comprising, in combination, a by-pass valve having a casing formed with an exhaust outlet, a valve bore, a control chamber open to one end of said bore and having a control pressure liquid inlet, and a main flow passage having a pressure port open to the side of said bore and adapted to receive pressure liquid, a cylindrical piston-type valve plunger slidable in said bore and having one end projecting into and exposed to the prevailing pressure in said chamber, stop means for locating said plunger in normal position, and spring means acting on said plunger to move said plunger in opposition to the pressure in said chamber against said stop means, said plunger being formed with first port means permitting liquid flow from said chamber to said exhaust outlet when said plunger is in normal position and capable of building up back pressure in said chamber as the rate of said flow is sufficiently increased to effect movement of said plunger out of normal position and becoming blocked as said plunger is moved out of normal position, said plunger being formed with second port means blocked from said pressure port when said plunger is in normal position and permitting liquid flow from said pressure port to said exhaust outlet when said plunger is moved out of normal position, said plunger being formed with leak port means for connecting said pressure port to said chamber when said plunger is moved out of normal position, and control valve means operable in response to predetermined pressure conditions in said flow passage either to relieve the pressure in said control chamber or by-pass pressure liquid from said flow passage to said control chamber.

11. An unloading valve assembly comprising, in combination, a by-pass valve having a casing formed with an exhaust outlet, a valve bore, a control chamber open to one end of said bore and having a control pressure liquid inlet, and a main flow passage having a pressure port open to the side of said bore and adapted to receive pressure liquid, a tubular valve plunger slidable in said bore and open at one end to said exhaust outlet and having a closed opposite end projecting into and exposed to the prevailing pressure in said chamber, adjustable stop means for locating said plunger in a normal end position, and spring means biasing said plunger to move in opposition to the pressure in said chamber, said plunger in response to a predetermined pressure rise in said chamber being movable out of normal position into an unloading position, said plunger being formed in its peripheral wall with an unloading port blocked by the wall of said bore when said plunger is in normal position and open to said pressure port when said plunger is in unloading position, and with a helically arranged series of by-pass ports open to said chamber when said plunger is in normal position and blocked by said bore wall when said plunger is in unloading position, and being formed in its outer periphery with a longitudinal leak groove open to said chamber and movable into restricted communication with said pressure port as said plunger is moved into unloading position, and control valve means for by-passing a variable volume of pressure liquid from said flow passage to said control chamber, said by-pass ports being effective to pass liquid below a predetermined volume without effecting movement of said plunger out of normal position, and to create a back pressure in said chamber when the flow of liquid exceeds said volume to effect movement of said plunger out of normal position into unloading position.

JOHN MAURICE TOWLER.
FRANK HATHORN TOWLER.

References Cited in the file of this patent

UNITED STATES PATENTS

| Number | Name | Date |
|---|---|---|
| 2,051,301 | Kleckner et al. | Aug. 18, 1936 |
| 2,149,864 | Osborne | Mar. 7, 1939 |
| 2,401,845 | Stephens | June 11, 1946 |
| 2,421,133 | Towler | May 27, 1947 |
| 2,429,489 | Roth | Oct. 21, 1947 |
| 2,437,480 | Pugh | Mar. 9, 1948 |
| 2,473,953 | Huber | June 21, 1949 |
| 2,474,122 | Schneck | June 21, 1949 |